United States Patent [19]

Leo

[11] 4,228,657
[45] Oct. 21, 1980

[54] REGENERATIVE SCREW EXPANDER

[75] Inventor: Bruno S. Leo, Santa Monica, Calif.

[73] Assignee: Hughes Aircraft Company, Culver City, Calif.

[21] Appl. No.: 931,213

[22] Filed: Aug. 4, 1978

[51] Int. Cl.³ .............................................. F03G 7/00
[52] U.S. Cl. ....................................... 60/641; 60/670; 418/83
[58] Field of Search ................. 60/641, 643, 645, 670, 60/651, 671, 676, 679; 418/83, 201; 415/178

[56] References Cited

U.S. PATENT DOCUMENTS

| 3,405,604 | 10/1968 | Lysholm | 418/201 X |
| 3,751,673 | 8/1973 | Sprankle | 60/641 X |
| 3,827,243 | 8/1974 | Paull et al. | 60/641 |

Primary Examiner—Allen M. Ostrager
Assistant Examiner—Stephen F. Husar
Attorney, Agent, or Firm—Allen A. Dicke, Jr.; W. H. MacAllister

[57] ABSTRACT

Screw expander is employed in closed cycle steam power cycle and employs heat extraction during steam expansion to improve Rankine cycle efficiency.

11 Claims, 7 Drawing Figures

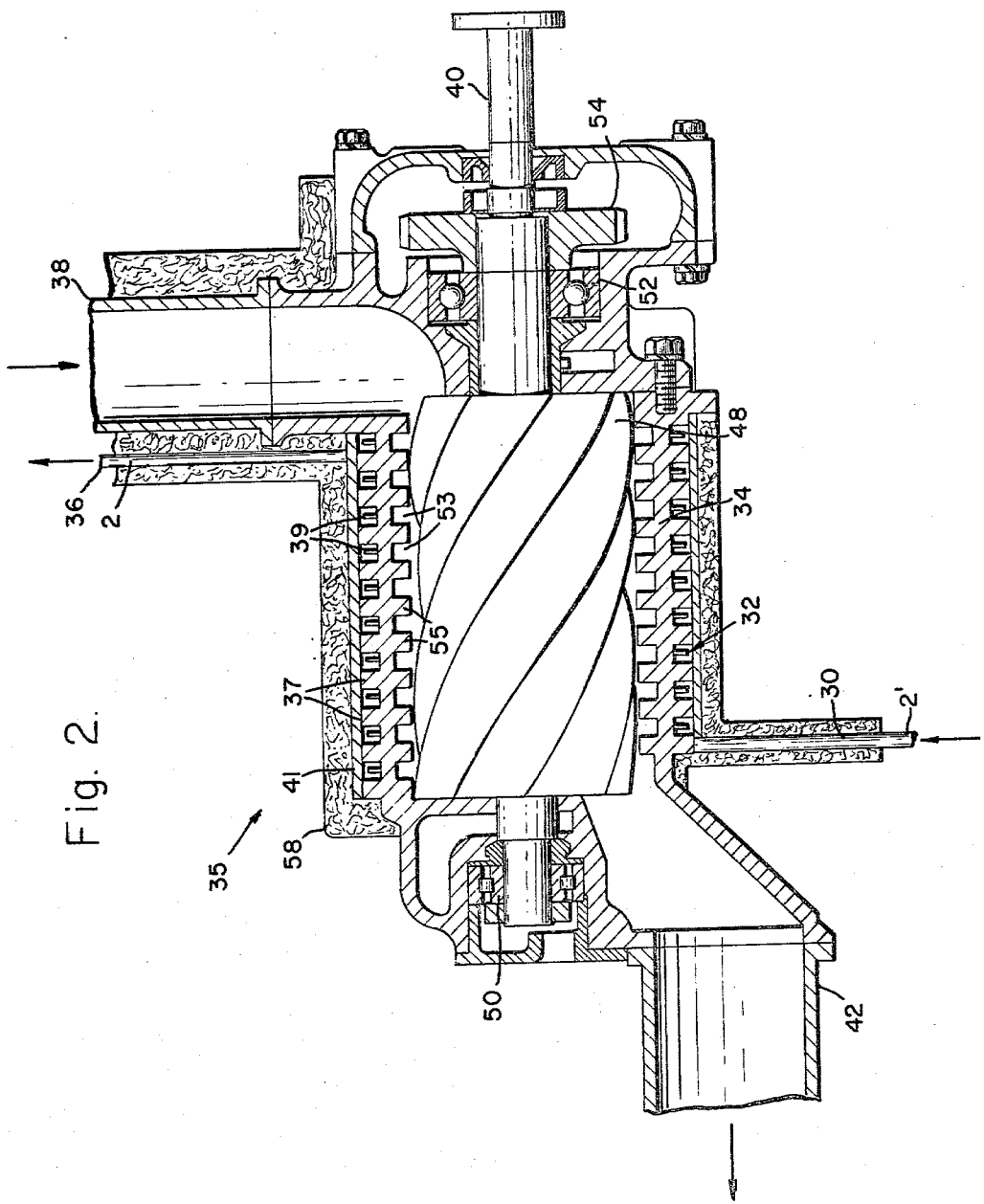

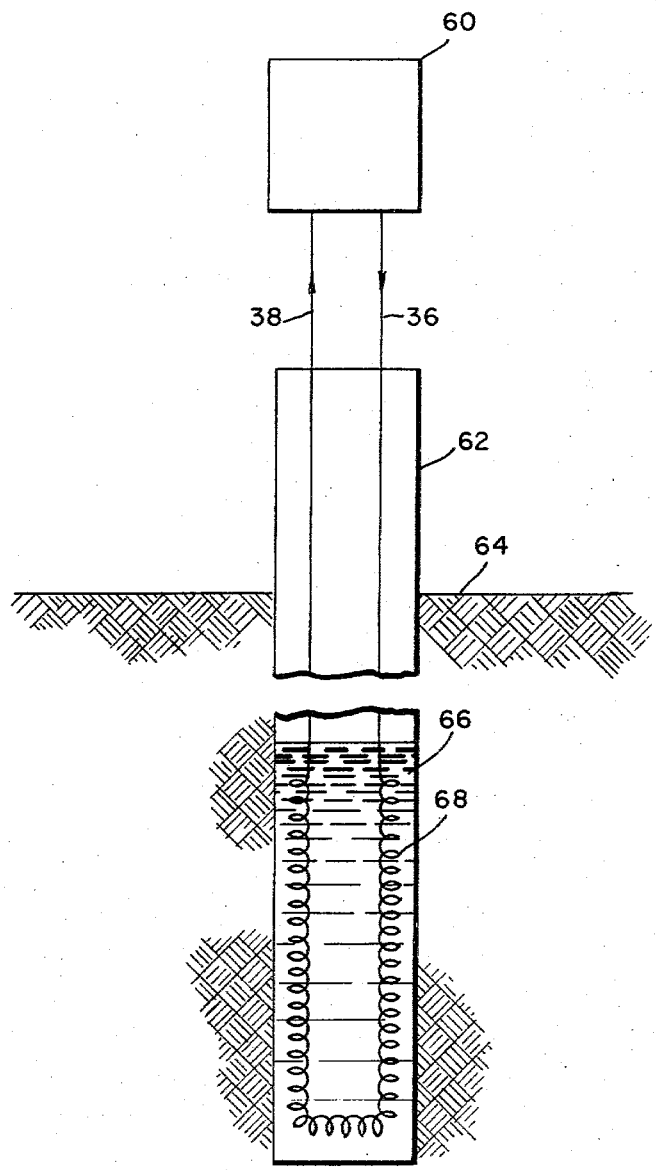
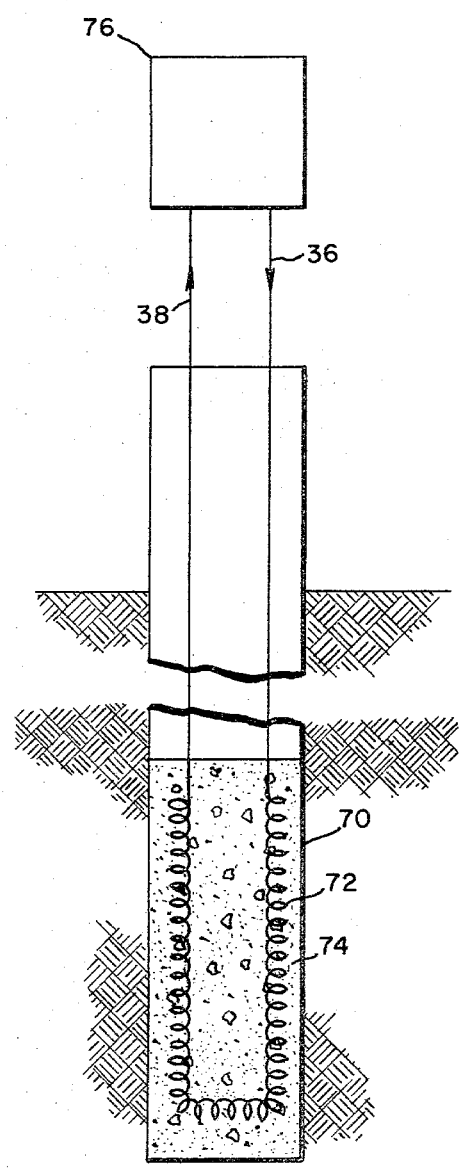

REGENERATIVE SCREW EXPANDER

BACKGROUND OF THE INVENTION

This invention is directed to a closed steam thermodynamic power cycle and particularly the employment of a screw expander in such a cycle wherein the expansion of the steam occurs between rotor lobes, and particularly one in which heat exchange is accomplished during expansion to improve cycle efficiency.

Lysholm built an early prototype of the rotory screw compressor in 1934. Some of his development work was described in the *Proceedings of the Institution of Mechanical Engineers*, Vol. 150, No. 1, pages 11–16 and four plates, 1943. The Lysholm-type rotary screw compressor has two rotors with intermeshing lobes. Within the intermesh of the lobes and housing, compression or expansion takes place depending upon the direction of rotation and the consequent direction of flow. Two helical rotors comprise the working parts of this screw expander. The male rotor generally has four lobes and rotates 50% faster than the female rotor which has six flutes between which are grooves in which the lobes engage. Other ratios of lobes to flutes are also used. Gas is expanded in the spaces between the housing, the lobes and the grooves. The lobes and the grooves are helical so that the space appears to move progressively toward the outlet end of the housing and the space becomes progressively larger along the length of the rotors as the rotors rotate. Thus, gas taken in at the inlet port at the high pressure end is expanded in the spaces as the rotors turn and it is finally delivered at lower pressure from the outlet port at the delivery end of the housing. The inlet and outlet ports are automatically covered and uncovered by the shaped ends of the rotors as they turn. Most of the work on the Lysholm type of screw machine has been in the area where the machine is used as a compressor. Most of the patents are owned by Svenska Rotor Maskiner, which devoted the pioneer effort in this art and appears to hold most of the patents. The company is located in Nacka, Sweden.

Nilsson U.S. Pat. No. 3,245,612 and Schibbye U.S. Pat. Nos. 3,283,996 and 3,423,017 are particularly directed to the shapes of the lands and the grooves on the rotors, but show the porting in general organization. These patents show how compression and expansion are achieved in such a structure. Sprankle U.S. Pat. No. 3,977,818 shows a particular helical screw expander having a throttle valve particularly useful for the expansion of geothermal fluid streams.

Furthermore, Sprankle U.S. Pat. No. 3,751,673 shows a helical screw expander in a geothermal power utilization system wherein saturated liquid which is the direct product of the geothermal well is expanded and partially flashed in the screw expander during the expansion process. The problem with that cycle is that there is very little enthalpy change through the expander so that it is difficult to extract adequate power to warrant such an installation.

A publication which is related to the same art, the direct expansion of a geothermal fluid stream through a screw expander, is "The Helical Screw Expander Evaluation Project" by Richard A. McKay of the Jet Propulsion Laboratory, published May, 1977 in the Proceedings of the Twelfth Intersociety Energy Conversion Engineering Conference at pages 899–903.

When the screw expander is used as an expansion engine in an external combustion circuit, then the screw expander needs cooling. The present materials are not sufficiently well developed to permit operation of the screw expander at local temperatures without extracting some heat. Lindhagen U.S. Pat. No. 2,808,813 discusses the use of the screw expander in such an environment. Nilsson U.S. Pat. No. 2,755,990 describes a housing by which the screw expander can be cooled by cooling air circulating in a chamber surrounding the structural part of the housing. Screw machinery of this type has found its greatest use as gas compressors, and the cooling is in the nature of removing the heat of compression. The prior art includes no effort to improve cycle efficiency when the screw machine is employed as an expander for extracting work from a thermal fluid stream.

SUMMARY OF THE INVENTION

In order to aid in the understanding of this invention, it can be stated in essentially summary form that it is directed to a regenerative screw expander and to a thermodynamic closed-cycle system which incorporates the regenerative screw expander. The screw expander has counter rotating rotors with interengaging lobes and grooves in spiral configuration so that the spaces between the rotors and the rotor housing define volumes which expand internally of the screw expander. A thermodynamic fluid is expanded in the expander and at the same time heat is extracted from the expander in order to improve system efficiency.

It is thus an object of this invention to provide a regenerative screw expander where thermodynamic fluid can be expanded to produce work, with the extraction of heat from the expanding fluid improving cycle efficiency.

It is another object to provide a closed-cycle thermodynamic system wherein a thermodynamic fluid is circulated from a condenser, through a feed pump to the boiler which supplies fluid vapor to the expander, with the system including reheating of the feed liquid from the condenser by extracting heat from the screw expander housing to improve cycle efficiency.

It is another object to provide a closed-cycle thermodynamic system which is capable of efficiently operating at lower temperatures and with lower quality steam so that the heat source providing the primary thermal input to the system can be at a lower temperature, such as geothermal fluids, or waste heat from diesel exhaust so that work can be efficiently extracted from sources which are presently considered to be uneconomic.

Other objects and advantages of this invention will become apparent from a study of the following portion of this specification, the claims and the attached drawings.

BRIEF DESCRIPTION OF THE DRAWINGS

FIG. 2 is a longitudinal section through the regenerative screw expander, taken on the axis of one of the rotors, and showing the regenerative coil around the screw expander housing.

FIG. 4 is a schematic diagram of the thermodynamic cycle, similar to the diagram shown in FIG. 1 but showing the steam generating heat exchanger as being submerged into the geothermal zone.

FIG. 5 is a schematic diagram, similar to FIG. 4 and showing the steam generated heat exchanger as being located in the thermodynamic zone and being coupled to the zone by means of a solid thermal coupling.

DESCRIPTION OF THE PREFERRED EMBODIMENT

Figure 1:
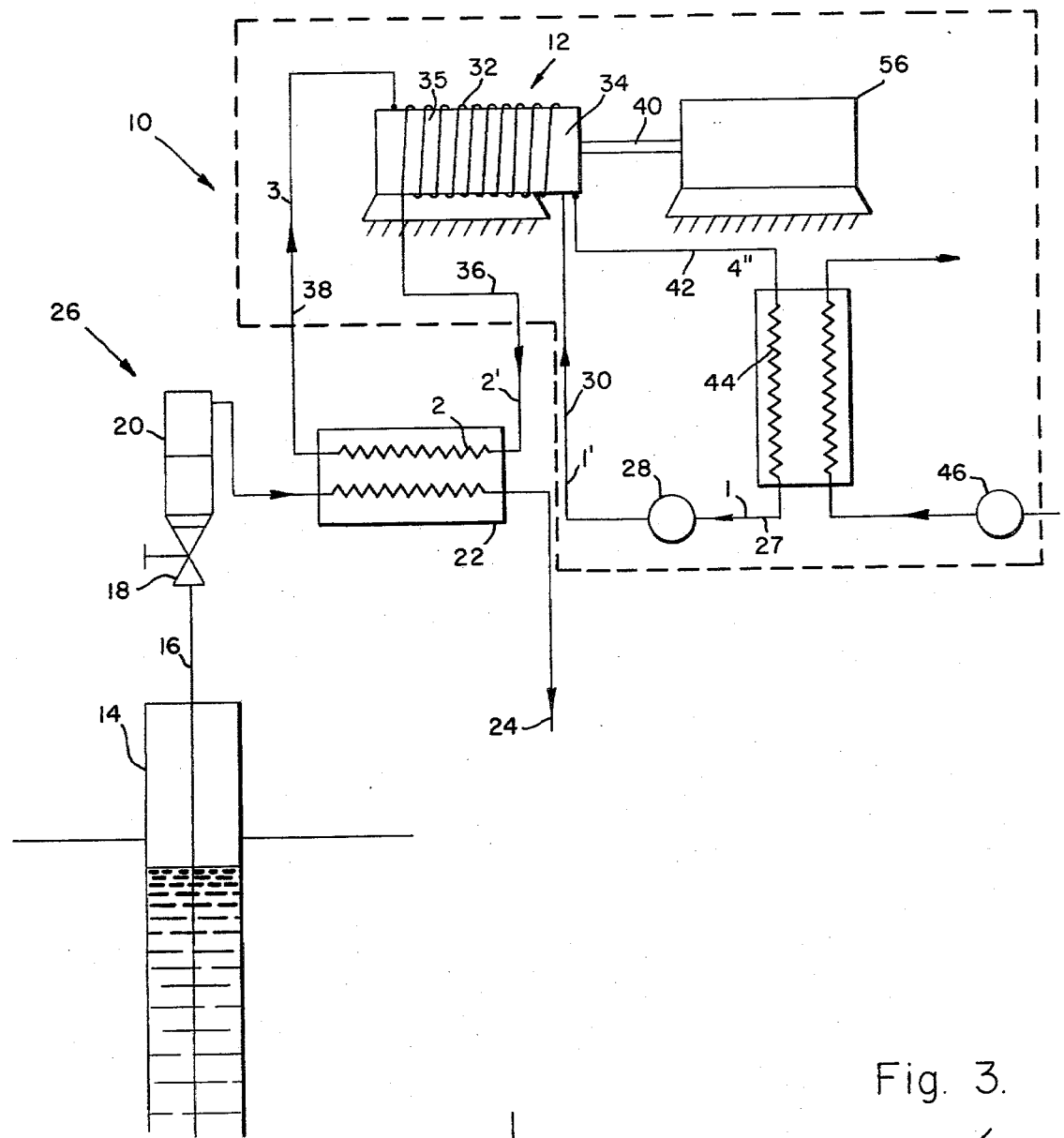
FIG. 1 is a schematic diagram of the thermodynamic cycle, showing the closed cycle through the regenerative screw expander receiving its heat from a geothermal source.

FIG. 1 shows at 10 a closed cycle thermodynamic system incorporating a regenerative screw expander 12 in accordance with this invention. Heat for the closed system can be supplied from any convenient source, and in the example of FIG. 1, a geothermal well 14 supplies pressurized hot water or brine to a wellhead line 16 which delivers liquid to a throttling valve 18. Values for a particular example are given in Table I. The liquid flashes to wet steam through the valve 18. Solid material such as scale and salt is separated from the wet steam fluid stream by a separator 20 and the wet steam is delivered to a heat exchanger 22 as the heat supply thereto. In counterflow heat exchange, the condensed geothermal fluid from the heat exchanger 22 is delivered in a return line 24. In some geothermal fields, this water is returned to the subterranean hot region by injection wells. From this description, it is seen that a geothermal heat supply system 26 supplies heat to the heat exchanger 22 which is also part of the closed cycle thermodynamic system 10. The geothermal system 26 is an example of a suitable heat supply, but other sources of heat such as diesel exhaust waste heat or solar heating could be employed to supply the heat to the heat exchanger 22. Other geothermal sources are shown in FIGS. 4 and 5.

The closed cycle thermodynamic system can employ any fluid of suitable properties. For the present example, water is employed as the example. In the closed cycle thermodynamic system 10 illustrated in FIG. 1, the inlet to a feedpump 28 is saturated liquid at point 1 in the T-S diagram of FIG. 3. A feedwater line 30 at the discharge of the feedpump 28 is represented at point 1′ in FIG. 3. The temperature difference between 1 and 1′ due to the compression of the feedwater by pump 28 is exaggerated in FIG. 3.

A regenerative heater 32 receives the feedwater. The regenerative heater 32 is intimately associated with a housing 34 of a screw expander 35, see FIG. 2. The illustrated regenerative heater is a spiral passage formed of fins 37 around the housing 34 so that the expanding steam within the housing gives up some of the heat to the feedwater flow through the feedwater regenerative heater 32. Further enhanced area is provided by the additional fins 39 on the exterior structure of the housing 34. Conveniently, these passages can be manifolded by an exterior cover 41 to provide a spiral heat exchanger with feedwater flow from left to right along the housing 34 as seen in FIG. 2. A less efficient heat exchanger, but one which might more easily be fabricated, would be the winding of tubing in a spiral around the exterior of the housing 34, together with proper thermal bonding of the tubing to the housing 34. This thermal bonding preferably would be by brazing or the like. The heat exchange tubing in that case preferably would have internal fins to maximize thermal coupling to the feedwater. The feedwater is in counterflow to the fluid through the interior of the housing 34 and thus this jacket is as the feedwater regenerative heater 32. The heater 32 is protected against thermal loss by a body of insulation 58 surrounding the structure.

Figure 3:
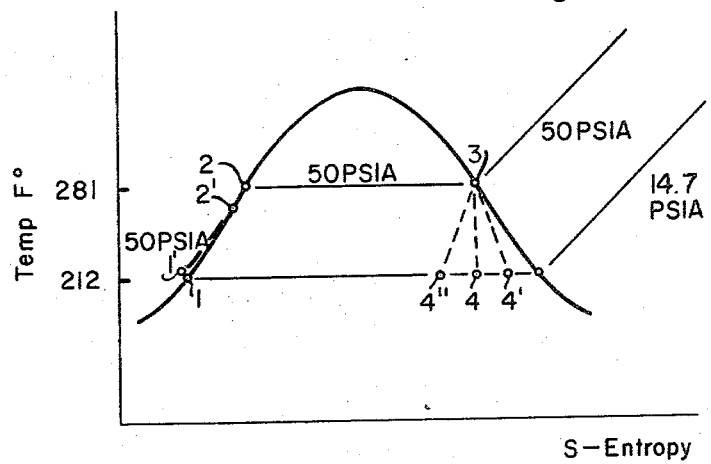
FIG. 3 is a temperature-entropy diagram showing examples of several thermodynamic cycles, comparing the regenerative cycle of this invention with an non-regenerative cycle.

A heated feedwater line 36 is represented at point 2′ of the T-S diagram of FIG. 3. The heated feedwater line 36 delivers the feedwater to the heat exchanger 22 which acts as a boiler and which is in counter flow heat exchange with the geothermal fluid. During heating in the heat exchanger 22, the conditions move from point 2′ past point 2 to point 3. A steam line 38 has conditions represented by point 3 in FIG. 3 and delivers steam to the steam inlet of the screw expander 35. During the expansion process in the screw expander, work is produced to provide output shaft work at a shaft 40, the steam is expanded to become wet and the pressure is reduced as the steam passes to an exhaust line 42 and heat is extracted from the expanding steam in the screw expander through the screw expander housing 34 into the feedwater flowing in the regenerative heater 32, as previously described. Due to the extraction of heat from the expanding steam, the cycle is regenerative and the conditions in the exhaust line 42 at the outlet of the expander are at point 4″ on the T-S diagram of FIG. 3. If the regenerative cycle were not employed, the expansion would have gone to point 4′.

As seen in FIG. 1, the exhaust line 42 is connected to a condenser 44 wherein the steam is condensed and returned to saturated water in the condensate line 27. The condenser 44 is cooled by any appropriate and convenient cooling fluid. In the example shown, condenser cooling water is supplied by a circulating pump 46 from any prime source such as the sea, lake or river or may be supplied from a cooling pond or tower. On the other hand, direct air cooling can be employed with the condenser if there is a shortage of water.

The screw expander 35 is shown in more detail in FIG. 2. It has a pair of lobed rotors within the housing 34. One of the rotors is a rotor 48 shown as being mounted on the shaft 40. The shaft 40 is carried on a set of bearings 50 and 52 which are protected by seals and are lubricated from the adjacent lubricant chambers. Timing gears, one of which is shown as a gear 54 maintain the rotors in synchronism so that there is no physical contact between the rotors themselves. Furthermore, there is clearance between the rotors and the housing so that no mechanical wear takes place. The rotors run at a comparatively high speed and thus are capable of efficiently expanding the steam. While the expanding fluid is turbulent against the inner surface of the housing 34, to thus make for good heat exchange, if desired the area can be expanded by having a set of internal grooves 53 which leave between them a set of fins 55 to enhance heat exchange. The grooves and fins are preferably spiral at the same angle as the rotors with which they are associated in order to maintain the sealing between the rotor lobes and the interior surface of the housing 34, now represented by the end surfaces of the fins 55. Furthermore, such grooves and fins may aid in sealing by providing a labyrinth-type seal at the outer surface of each lobe where it approaches the inner surface of the housing. As shown in FIG. 1, the shaft 40 is connected to a generator 56 as a device which can utilize the work produced by the expander. In order to maintain expander efficiency, the insulation 58 is applied to the hot parts of the expander.

The following table gives the conditions around the cycle. In order to permit calculation of the improvement in efficiency, the conditions are given for point 4', for those conditions in which the device would not be regenerative in order to calculate the efficiency.

TABLE I

| Location | Temperature °F | Pressure PSIA | Enthalpy h BTH/LbM | Quality |
|---|---|---|---|---|
| Well head line 16 | | 165 | 339 | saturated water |
| Separator 20 | 293 | 60 | 339 | wet steam |
| Return line 24 | | 60 | 262 | water saturated |
| Condensate line 27 Point 1 | 212 | 14.7 | 180 | water |
| Feedwater 30 Point 1' | | 50 | 180 | water |
| Htd Feedwater 36 Point 2' | | 50 | 243 | water saturated |
| Htd Feedwater Point 2 | | 50 | 250 | water saturated |
| Steam line 38 Point 3 | 281 | 50 | 1174 | steam |
| Exhaust line 42 Point 4" | 212 | 14.7 | 1008 | wet steam |
| Point 4' | 212 | 14.7 | 110 | wet steam |
| Point 4 | 212 | 14.7 | 1082 | wet steam |

In order to indicate the improvement of the cycle efficiency, with the regenerative expander compared to a non-regenerative expander, the following solution is provided. The cycle efficiency is defined by $$Eff_c = \frac{(Q_1 - Q_2)}{Q_1} = 1 - \frac{Q_2}{Q_1} \quad (1)$$

where, according to the first law of thermodynamics $(Q_1 - Q_2)$ is equal to the work produced by the cycle.

For the regenerative cycle and by the first law of thermodynamics $$Q_1 = h_3 - Eff_R(9h_2 - h_1), B/LB_M \quad (2)$$

$$Q_2 = h_{4''} - h_1, BTU/LB_M \quad (3)$$

Using the first law of thermodynamics, the regenerative expander efficiency is defined by $$Eff_E = \frac{h_3 - h_{4''} - Eff_R(9h_2 - h_1)}{(h_3 - h_4)}, \quad (4)$$

Where $Eff_R(h_2-h_1)$ is the heat extracted from the expander and added to the boiler feed water. Solving for $h_{4''}$ gives, $$h_{4''} = h_3 - Eff_R(h_2-h_1) - Eff_E(h_3-h_4), BTU/LB_M \quad (5)$$

Thus, the regenerative cycle efficiency is expressed by, $$Eff_c = 1 - \frac{h_3 - Eff_R(h_2 - h_1) - Eff_E(h_3 - h_4) - h_1}{(h_3 - h_1 - Eff_R(h_2 - h_1)}, \quad (6)$$

From FIG. 3 and using steam tables the regenerative cycle efficiency = 8.0% if it is assumed that regenerator effectiveness and expander efficiency equal 0.9 and 0.8, respectively. Using the first law of thermodynamics, the nonregenerative expander efficiency is defined by, $$Eff_E = (h_3 - h_{4'})/(h_3 - h_4) \quad (7)$$

Solving for h, and substituting into Equation (1) gives the nonregenerative cycle efficiency, $$Eff_C = 1 - \frac{h_3 - Eff_E(h_3 - h_4) - h_1}{h_3 - h_1} \quad (8)$$

Which, using the same expander efficiency as above and FIG. 3 calculates to 7.4%.

The Carnot cycle efficiency for the temperature limits shown in Table 1 = 9.3%.

SYMBOLS $h_{4''}$ = Enthalpy of mixture at point 4" calculated from Eq 5
$Q_1$ = Heat added to cycle, BTU/Lb$_M$ calculated from Eq 2
$Q_2$ = Heat rejected by cycle, BTU/Lb$_M$ calculated from Eq 3
$Eff_C$ = Cycle efficiency calculated from Eq 6
$Eff_E$ = Efficiency of expander 0.8
$Eff_R$ = Efficiency of regenerator 0.9

Power systems in the range of one to ten megawatts would produce efficiencies in these ranges. Such power system size is approximately scaled to one geothermal well so that the system can be installed at the wellhead, without encountering pipeline loss, as where steam collection systems are required.

FIG. 1 shows a system where steam is extracted from the well 14 and supplies heat to the closed thermodynamic system by means of heat exchanger 22, which acts as a boiler in the closed-circuit side of the system and acts as a condensor for the geothermal steam. In those cases where it is more economically desirable to achieve the steam generation in the geothermal zone, the closed cycle heat exchanger boiler can be located in that zone. FIG. 4 shows a thermodynamic system 60 which is the same as the system 10 in FIG. 1. In the system 60 a heat exchanger 68 substitutes for the heat exchanger 22.

A well 62 is bored into a geothermal region 64 of the earth and terminates well below the surface. A volume of brine 66 of natural origin partly fills the well 62. Heat exchanger 68 is submerged in the brine and is connected to the heated feedwater line 36 and the steam line 38. Heat received by the feedwater in the heat exchanger 68 in the subsurface geothermal hot region boils the closed cycle circulating water to steam and the steam is delivered to the inlet of the screw expander 35. Heated feedwater line 36 and steam line 38 are insulated in those portions where heat exchange between the fluid in the lines and the local ambient would be undesirable. The closed-cycle thermodynamic system 60 of FIG. 4 is desirable in that it does not require extraction of native fluids from the well, but only withdraws the heat therefrom.

FIG. 5 shows the lower portion of another well 70 also drilled from gthe surface into a geothermal region. The difference between the lower portion of the well 62 and the lower portion of the well 70 is that the well 70 does not contain any natural liquids. Instead, in the system of FIG. 5, a heat exchanger 72 is located in the geothermal zone and is thermally coupled to the native rock around the well by means of a solidified mass 74.

The solidified mass 74 is preferably of high thermal conductivity, and may be such material as concrete loaded with aluminum chips. The mass 74 thus serves as a thermal coupling between the subsurface structure of the geothermal heat source and the heat exchanger 72. The heat exchanger 72 is coupled to an above ground system 76 in the same manner as the system of FIG. 4, with suitable insulation on the lines. In FIG. 5, the heated feedwater line is indicated at 36 and the steam line is indicated at 38 to show the manner in which it is connected into the balance of the closed-cycle thermodynamic system 76. The system 76 is the same as the systems 10 and 60. Each of these closed-cycle thermodynamic systems achieves a gain in efficiency by providing regenerative heating on the screw expander.

Figure 6:
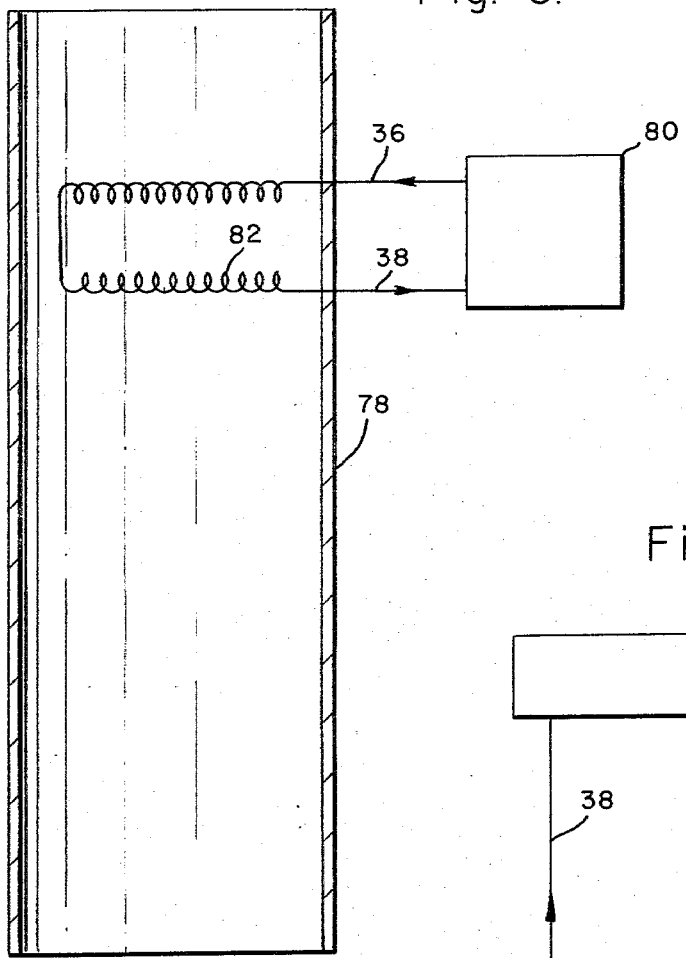
FIG. 6 is a schematic diagram of the thermal dynamic cycle, similar to the diargam shown in FIG. 1 but showing the steam generating heat exchanger as being positioned in a hot exhaust stack.

FIG. 6 shows a system by which waste heat can be extracted from a stack 78 through which gas flows upwardly as is indicated in the FIG. The hot waste gas may be diesel engine exhaust or may be a process equipment stack which would otherwise waste heat to atmosphere, or other waste heat gas stream. A system 80 is the same as the systems 10 and 60 and is connected by the lines 36 and 38 to a heat exchanger coil 82 positioned in the gas stream flow. In this way, low level waste heat can be utilized.

Figure 7:
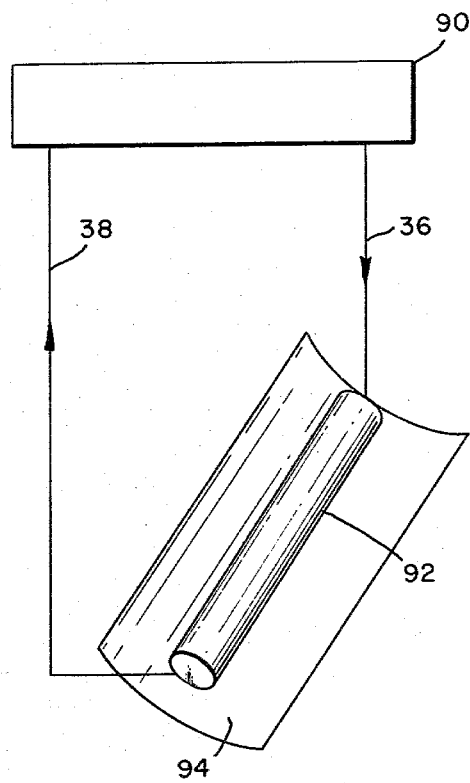
FIG. 7 is a schematic diagram of the thermal dynamic cycle, similar to the diagram shown in FIG. 1 but showing the steam generating heat exchanger as being solar heated and positioned at the focus of the solar heat concentrator.

FIG. 7 illustrates a system wherein a thermodynamic system 90, identical to the system 10 is connected by the lines 36 and 38 to a boiler 92 which is positioned within a solar concentrator 94. The solar concentrator 94 is directed to the source of solar energy, concentrates it and heats the boiler so that solar energy is employed to produce the steam in line 38 to supply the system 90.

From this analysis, it can be seen that the regenerative cycle of this invention is more efficient than the non-regenerative cycle and substantially approaches the Carnot cycle efficiency. Thus, the employment of a regenerative screw expander provides an important conservation of energy by it providing more recoverable energy from heat, particularly low-grade heat sources.

This invention having been described in its preferred embodiment, it is clear that it is susceptible to numerous modifications and changes within the ability of those skilled in the art and without the the exercise of the inventive faculty. Accordingly, the scope of this invention is defined by the scope in the following claims.

What is claimed is:

1. A regenerative screw expander for use in expanding a thermodynamic fluid stream for extracting work therefrom, said expander comprising:
   a housing, intermeshing rotors in said housing for defining space in a fluid path through said housing which expands as said rotors turn within said housing for the expansion of a thermodynamic fluid passing along said path; and
   a heat exchanger on said housing for extracting heat from said housing as thermodynamic fluid is expanded as it passes along said path through said housing and for returning the extracted heat to the thermodynamic fluid stream.

2. A thermodynamic system comprising:
   a closed path for the circulation of a thermodynamic fluid;
   a screw expander on said flow path of thermodynamic fluid for receiving the thermodynamic fluid at a higher pressure and expanding it to a lower pressure and extracting work from the fluid, said screw expander having intermeshing rotors and a housing, and said intermeshing rotors and said housing defining space on the fluid path which expands as said rotors rotate, said rotors being connected as they rotate for the extraction of work from the fluid stream;
   a regenerative heater connected to receive heat from said housing of said screw expander, said regenerative heater being connected in said fluid path to receive fluid after it has been expanded in said expander and is being reheated; and
   a boiler connected in said closed fluid path, said boiler receiving fluid from said regenerative heater and further heating said fluid and delivering said further heated fluid to said screw expander for expansion.

3. A thermodynamic system comprising:
   a closed path for the circulation of a thermodynamic fluid;
   a screw expander on said flow path of thermodynamic fluid for receiving the thermodynamic fluid at a higher pressure and expanding it to a lower pressure and extracting work from the fluid, said screw expander having intermeshing rotors and a housing, said intermeshing rotors and said housing defining space on the fluid path which expands as said rotors rotate, said rotors being connected as they rotate for the extraction of work from the fluid stream;
   a condenser connected to receive thermodynamic fluid at the outlet of said regenerative screw expander for condensing the fluid;
   a regenerative heater connected to receive heat from said housing of said screw expander, said regenerative heater being connected in said fluid path to receive fluid after it has been expanded in said expander and is being reheated; and
   a boiler connected in said closed fluid path, said boiler receiving fluid from said regenerative heater and further heating said fluid and delivering said further heated fluid to said screw expander for expansion.

4. A thermodynamic system comprising:
   a closed path for circulation of a thermodynamic fluid;
   a screw expander on said flow path of said thermodynamic fluid for receiving the thermodynamic fluid at a higher pressure and expanding it to a lower pressure and extracting work from the fluid, said screw expander having intermeshing rotors and a housing, and said intermeshing rotors and said housing defining space on the fluid path which expands as said rotors rotate, said rotors being connected as they rotate for the extraction of work from the fluid stream;
   a condenser connected to receive thermodynamic fluid fluid of the outlet of said regenerative screw expander for condensing the fluid;
   a regenerative heater connected to receive heat from said housing of said screw expander, said regenerative heater being connected in said fluid path to receive fluid after it has been expanded in said expander and is being reheated;
   a feed pump in said closed thermodynamic fluid path, said condenser being connected to deliver liquid to said feed pump and the liquid from said feed pump is delivered to said heat exchanger on said regenerative screw expander so that the feed liquid is reheated; and a boiler connected in said closed fluid path, said boiler receiving fluid from said regenerative heater and further heating said fluid and delivering said further heated fluid to said screw expander for expansion.

5. The system of claim 4 wherein heat to said boiler is supplied by a separate open thermodynamic fluid path which starts at a geothermal well.

6. The system of claim 2 wherein heat to said boiler is supplied by a separate open thermodynamic fluid path which starts at a geothermal well.

7. A thermodynamic system comprising:
a closed path for the circulation of a thermodynamic fluid;
a screw expander on said flow path of thermodynamic fluid for receiving the thermodynamic fluid at a higher pressure and expanding it to a lower pressure and extracting work from the fluid, said screw expander having intermeshing rotors and a housing, and said intermeshing rotors and said housing defining space on the fluid path which expands as said rotors rotate, said rotors being connected as they rotate for the extraction of work from the fluid stream;
a regenerative heater connected to receive heat from said housing of said screw expander, said regenerative heater being connected in said fluid path to receive fluid after it has been expanded in said expander and is being reheated; and
a boiler connected in said closed fluid path, said boiler being positioned in a geothermal zone and receiving heat directly from a geothermal zone, said boiler receiving fluid from said regenerative heater and further heating said fluid and delivering said further heated fluid to said screw expander for expansion.

8. The system of claim 7 wherein said boiler is positioned in liquid in a well in a geothermal zone.

9. The system of claim 7 wherein said boiler is located in a geothermal zone and is thermally coupled to at least some of the adjacent geologic structure by means of a solid mass of thermal coupling material between said boiler and said geothermal mass.

10. The system of claim 2 wherein said boiler is positioned in an exhaust gas waste heat fluid stream.

11. The system of claim 2 wherein said boiler is positioned in a solar concentrator and receives solar energy as the principal heat source.

* * * * *